US 7,660,403 B2

(12) United States Patent
Gomez-Ortigoza

(10) Patent No.: US 7,660,403 B2
(45) Date of Patent: Feb. 9, 2010

(54) MULTI-NETWORKING COMMUNICATION SYSTEM AND METHOD

(75) Inventor: Ariel Gomez-Ortigoza, Gto (MX)

(73) Assignee: Ipsobox, S.A. de C.V., Irapuato (MX)

( * ) Notice: Subject to any disclaimer, the term of this patent is extended or adjusted under 35 U.S.C. 154(b) by 926 days.

(21) Appl. No.: 11/329,477

(22) Filed: Mar. 13, 2006

(65) Prior Publication Data
US 2006/0251225 A1 Nov. 9, 2006

Related U.S. Application Data

(60) Provisional application No. 60/678,510, filed on May 6, 2005.

(51) Int. Cl.
*H04M 15/00* (2006.01)
*H04M 1/64* (2006.01)
*H04M 11/00* (2006.01)

(52) U.S. Cl. .............. 379/114.2; 379/88.04; 379/88.13; 379/88.16; 370/352

(58) Field of Classification Search ................ 379/67.1, 379/88.01, 88.04, 88.11, 88.13, 88.16, 88.25, 379/88.02, 88.12, 88.17, 88.18, 88.23, 114.15, 379/114.2; 370/352–356; 455/412.1, 412.2, 455/413, 448, 466
See application file for complete search history.

(56) References Cited

U.S. PATENT DOCUMENTS

| | | | |
|---|---|---|---|
| 5,353,335 A | | 10/1994 | D'Urso et al. |
| 6,233,318 B1 | | 5/2001 | Picard et al. |
| 6,418,202 B1 | * | 7/2002 | Caldwell et al. ......... 379/88.25 |
| 2003/0048888 A1 | * | 3/2003 | Hopper et al. ........... 379/114.2 |
| 2004/0077334 A1 | | 4/2004 | Joyce et al. |

OTHER PUBLICATIONS

US Receiving Office, International Search Report, Oct. 17, 2007.
US Receiving Office, Written Opinion of the International Searching Authority, Oct. 17, 2007.

* cited by examiner

*Primary Examiner*—Binh K Tieu
(74) *Attorney, Agent, or Firm*—Pattric J. Rawlins; Procopio Cory Hargreves & Savitch LLP

(57) ABSTRACT

The architecture of the present invention includes a multi-media multi-network communication server connected to a variety of access and delivery platforms via a variety of communication networks. Access to services is controlled and billed by a virtual prepaid card and account that can be converted into a physical prepaid card that is delivered to the user via a physical delivery network such as the Postal Service or a point of sale. The access platforms are used by senders, recipients or agents to access their digital mailboxes on a multi-network communication server and to send and receive calls and messages. The messages can be in electronic format such as text, audio, graphic images, video, and audio-video. The calls can be packet switched or circuit switched. The multi-network communication may send a notification message to the recipient, indicating that a message has been received. The message can be accessed remotely or wireless. The message can be viewed, heard, or viewed and heard, depending on the capability of the delivery platform being used by the recipient user. It can be redirected to a different delivery platform or a particular delivery network. Over the phone the messages can be retrieved and responded by using solely the user voice.

20 Claims, 14 Drawing Sheets

| | |
|---|---|
| LETTER: | 1122 Main Street, San Diego, CA 92101 |
| TELEGRAM: | P.O. Box 300, San Diego, CA 92101 |
| VOICEMAIL: | 555-123-4567 |
| FAX: | 555-234-5678 |
| EMAIL: | user@email.com |
| SMS: | 555-345-6789 |
| TIVO: | 192.168.1.100.999 |
| PHONE: | 555-678-1234 |
| CELLULAR: | 555-666-7777 |
| BANK ACCOUNT: | 1234567890 |
| PREPAID CARD ACCOUNT: | 9876543210 |
| MP3: | 192.168.1.100.399 |

User Profile 177

FIG. 5.

MULTI-NETWORKING COMMUNICATION SYSTEM AND METHOD

RELATED APPLICATIONS

The present application claims priority to co-pending U.S. provisional patent application 60/678,510 filed on May 6, 2005, which is incorporated herein by reference in its entirety.

BACKGROUND

1. Field of the Invention

The present invention relates generally to the field of communications and more particularly relates to the receipt and delivery of multi-media calls and messages over multiple incompatible networks.

2. Related Art

There are many message conversion utilities and systems in the market today that are capable of passing messages to and from users who are accessible via different networks. For example, some conventional systems allow faxes to be delivered as emails and allow voicemails to be delivered as emails. The problem with the conventional systems is that they only work with messages that are in a conventional digital format that allows the message to be sent or received over networks that are compatible with the digital message format. There are also many ways to convert a circuit switched phone call into a packet switched phone call. For example, allow phone calls to be answered by a computer device. The problem with all the conventional systems is that they require the user to have a data device or interface as well as broadband access to be able to use them.

In conventional communication systems, person to person communication, calls, correspondence and messages have been delivered through fragmented information channels both digital and analog. Separate subscriptions and service providers are required for sending letters, telegrams, email, faxes and voicemail. Furthermore, conventional communication systems require individuals to possess or have access to many information appliances and a communication infrastructure to send and receive correspondence and messages, including for example a fax machine, a computer, a voicemail system, a telephone line, etc. Moreover, a single person must have unique and separate contact addresses for each conventional communication system: a phone number at home, a cellular number, a phone number at work, a fax number, an email address at home and at work, a physical address at home or at work, etc. This creates a very complicated communication scheme where users must have multiple hardware and software devices and try many different communication options before successfully contacting a person, at a high cost and at long delivery times. Even further, all of these conventional systems require prior data and computer training and knowledge of the commands and keystrokes that are necessary to operate them. Therefore, what is needed is a system and method that overcomes these significant problems found in the conventional systems and allow an inexperienced user to access them without prior knowledge.

SUMMARY

A multi-network communications server is connected to a variety of user access platforms through a variety of communication networks. The access platforms, which are the means for sending and delivering calls and messages, are used by sender users and recipient users and also by user agents acting on behalf of sender or recipient users. The access platforms may include: (1) data access devices such as PCs, PDAs, fax machines, ATMs and web enabled devices; (2) audio access devices such as telephones, wireless communication devices, audio players such as MP3 players; (3) video access platforms such as video phones, video recording devices, video cameras and PCs with video capable software utilities; and (4) user agent devices such as all of the above and including scanners and printers that an operator can use to convert otherwise incompatible hard copy communications to electronic communications for sender users and vice versa for recipient users.

A user can access the platform from a user computer account created for the user on a computer server. The user can access that account from a computer, a data platform, etc. Alternatively, a user can access the platform using a prepaid phone calling card. By purchasing such a phone card, the user purchases a phone access to the platform and the platform services.

There are several advantages of providing phone access to the platform in addition to providing computer access. For example, a phone user does not have to have any computer or internet experience to access and request platform services. A phone user can take advantage of the same services offered by the platform as the services offered to a user who accesses the platform via a computer. For example, a phone user, even without any previous computer/internet experience, can send/receive e-mails, send/receive mails, send/receive telegrams, use postal services, etc.

The functionality built into the platforms allows providing the same services to phone users as well as to computer users. For example, to facilitate the delivery of messages, mails, e-mails to a phone user, the platform utilizes a speech synthesis system. To facilitate the sending of voice messages and commands from a phone user, the platform utilizes a speech recognition system.

Another advantage of allowing a phone access to the platform is expanding platform services to users who use Voice over IP ("VoIP") technology. By accessing the platform over the phone, the VoIP users can use their "skype," "vonage" and "private" phone numbers ("DID"). As other users, the VoIP users can place calls, send/receive messages, send/ receive faxes, etc.

A sender user can, through one of the access platforms or a user agent, send a communication piece (e.g. a call, or a message) to a recipient user of the system (or a designated recipient that has access to any other network communicatively coupled with the communications server). The communication is addressed to the recipient user and stored in the recipient's digital inbox at the communications server. The server can then send a notice to the recipient user of the waiting message. The notice can be delivered to the recipient user through a preferred delivery platform, e.g. email, SMS, text page, phone call, or other.

Upon notice (or at any time) the recipient user can access the communications server to retrieve waiting messages from the digital inbox. The messages can be viewed (text and graphics), heard (audio), or both (video), depending on the recipient user's access platform capability. The recipient user may also (re)direct the communication to an email account, a fax number, a voice mail number, a bank account number, or a street address. The user can instruct the server to deliver the communication to the user either by interactive session such as a web session with the server or through a voice command session with the server. Additionally, communications can be saved in the user's digital inbox and also delivered via a physical delivery network such as the local postal office or local telegram office for exclusive or redundant delivery to the recipient user.

The multinetwork communication server can have a plurality of digital inboxes for storage of messages for a particular user. Each digital inbox can be hierarchically organized into directories and files, for example having separate directories for email, voicemail, fax, letters, telegrams, wire transfers, financial transactions, songs, videos, photographs, etc. The communications server can be communicatively coupled with the Internet, the local telephone network (PSTN), the local telegram network, the ATM network, the ACH network and other financial or communication networks allowing for the delivery of communications such as information, content and financial transactions. The communications server includes additional functionality such as tracking and tracing of communications as well as encryption, security, and confirmation/digital proof of delivery.

One aspect of the invention provides for a prepaid phone card that includes a phone number and digital inbox that is associated with the phone number, where the digital inbox is hosted by the communication server. The prepaid phone card may also include airtime, an email address, fax number, instant message address, and the like—all of which can be advantageously hosted by the communication server. The prepaid phone card may be distributed with a predetermined value to pay for the digital inbox services. The value of the prepaid phone card may also be increased periodically by payment transactions in a brick and mortar store location, a kiosk, over the telephone, or online. When a user conducts a transaction to increase the value of the phone card, the user can pay by cash, check, wire transfer, electronic debit, credit, or the like.

Another aspect of the invention is that it allows the user to send and retrieve all messages through voice by reading data messages using text to speech engines and instructing the user or portraying the message via voice recognition algorithms so that any user, without any prior knowledge of the system or training in data and computer devices can operate and navigate through his messages and calls. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 is a block diagram illustrating an exemplary user profile containing delivery addresses according to an embodiment of the invention;

DETAILED DESCRIPTION

Certain embodiments as disclosed herein provide for a multi-media multi-network communication server that is accessible via a plurality of access platforms over a variety of communication networks. The multi-network communication server is configured to send and receive messages for a plurality of users. The messages include a variety of types of messages, including emails, SMS, voicemail, faxes, letters, telegrams, wire transfers, automated clearing house transfers, and the like. For example, one method as disclosed herein allows for a first user to send an email to a second user that is delivered as a letter in hard copy (physical) by a postal employee.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
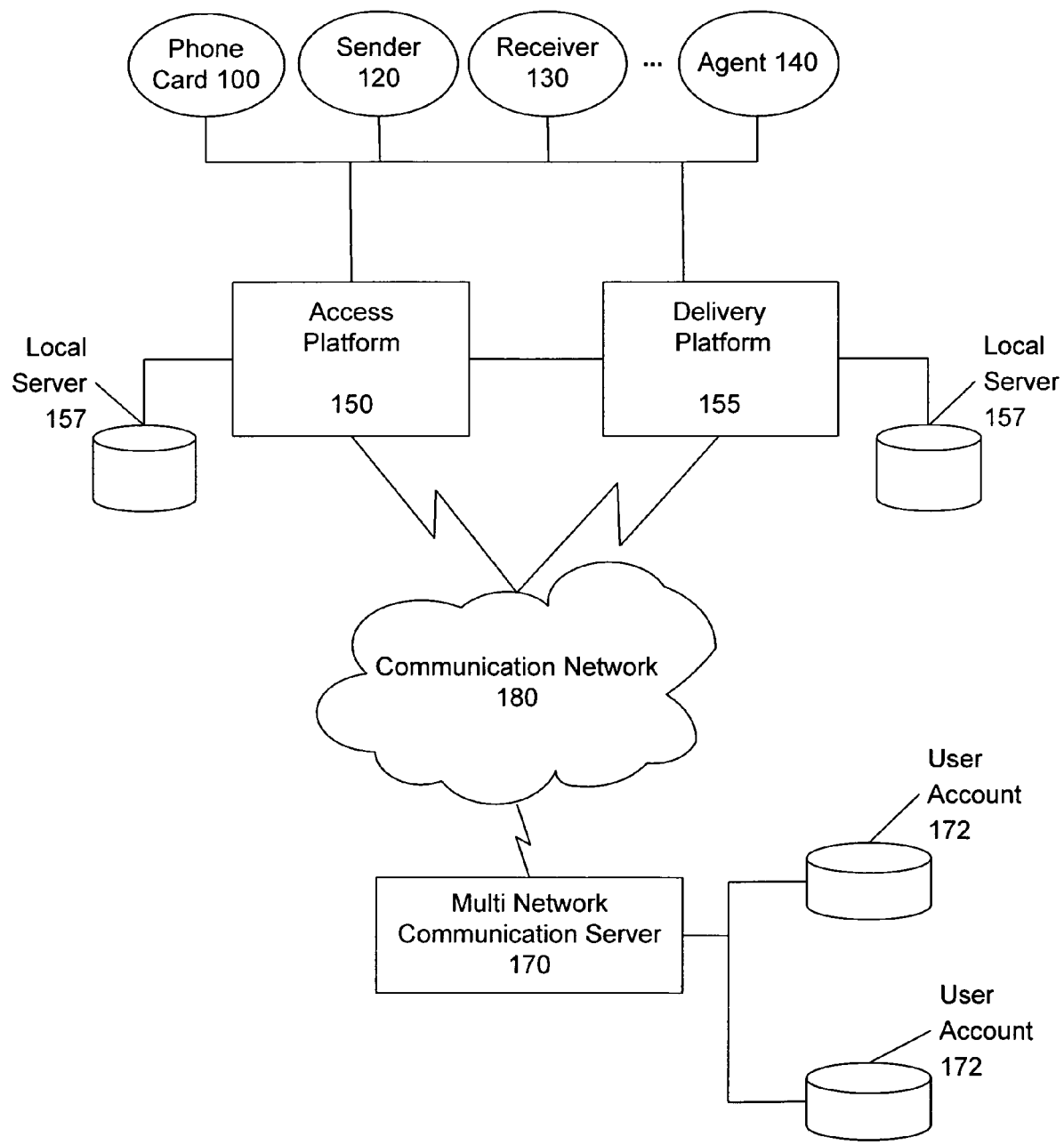
FIG. 1 is a high level network diagram illustrating a multi-network communication system according to an embodiment of the present invention.

FIG. 1 is a high level network diagram illustrating a multi-network communication system according to an embodiment of the present invention. In the illustrated embodiment, a multi-media multi-network server 170 is connected to a plurality of access and delivery platforms such as access platform 150 and delivery platform 155. The multi-media network server is also configured with one or more data storage areas containing a plurality of user accounts 172.

The multi-network communication server 170 is configured to maintain single mailbox for each user/subscriber aggregating all communication pieces to the user. Whenever a user enters the network from any access platform 150 at any location, the user can access all his/her correspondence and communication pieces. The user can then direct the delivery of these pieces to himself/herself or a third party through a variety of networks and delivery platforms 155.

The multi-network server 170 can be connected to a plurality of electronic and physical communication networks 180 including telephone networks, wireless communication networks, the Internet, postal and telegram networks, etc. (described in detail in FIG. 2). The communication networks 180 pass information between the server 170 and the access and delivery platforms 150 and 155 as described below.

In one embodiment, a sender user 120, a recipient user 130 or an agent 140 (acting on behalf of a sender or a recipient) can access the platform using the computer account 172 created on the multi network communication server 170. These users can access the platform from a computer, a data platform, etc. Alternatively, the platform can be accessed over a phone. Phone access to the platform is provided to prepaid phone card users 100.

A prepaid phone card user 100 can use a prepaid phone card to access the platform, send and receive messages and use the platform services as users who communicate with the platform from a computer. Using a prepaid phone card, the prepaid phone card user 100 can access the platform using a provided address, such as a Direct Inward Dial ("DID") number or an e-mail address. For example, the user 100 can dial a platform phone number and request the services over the phone. Alternatively, the user 100 can communicate with the platforms using e-mails.

There are several advantages of accessing the platforms from a phone instead of accessing the platforms from a computer. For example, a phone user does not have to have any computer or internet experience to use the platform services. For example, a phone user, even without any previous computer/internet experience, can send/receive e-mails, send/receive mails, send/receive telegrams, use postal services, etc. This is possible because of the functionality built into the platforms. For example, to facilitate the delivery of messages, mails, e-mails to a phone user, the platform utilizes a speech synthesis system. To facilitate the sending of voice messages and commands from a phone user, the platform utilizes a speech recognition system.

Another advantage of allowing a phone access to the platform is expansion of platform services to users who use Voice over IP ("VoIP") technology. By accessing the platform over the phone, the VoIP users can use their "skype," "vonage" and "private" phone numbers ("DID"). As other users, the VoIP users can place calls, send/receive messages, send/receive faxes, etc.

A user request to send a message over the communication network 180 is processed by an access platform 150, which is capable of sending information to the multi-network communication server 170. An example of the access platform 150 is a scanner that scans information into a digital format and passes it into the network. A user request to receive a message from the server is handled by a delivery platform 155 which reads information from the communication server 170 and delivers it to the user. Examples of delivery platforms 155 are printers, plotters, etc.

If a user wants to send and receive information from one platform, the user may select a platform that is capable of both, sending and receiving information. Such a platform should able to perform both functions: the passing of the information to the communication server 170 and the retrieving of the information from the communication server 170. Examples of such platforms are computers (e.g. PC), telephone, fax machines, etc.

The access platforms 150 and 155 can communicate with their local data storage areas 157 to store information, messages and notices related to the communication.

The multi-network server 170 provides remote access to a local network as if a user were in the local place. That access is provided by local data storage area 157 coupled with access platforms 150 and delivery platforms 155. Such an access saves a user both the time and transportation costs, and eliminates the distance barrier for communication. When the access is provided, the user can effectively become a user of the local network in spite of being in another geographic location.

The multi-network server 170 can also locate a user via a single identity (e.g. a user account described in FIG. 5). The server 170 can "learn" the connection routes to alternative destination networks, devices or physical addresses of the user.

The communication server 170 and local data storage area 157 may also provide an interface between the incompatible networks, such as the postal network or telegram network. The servers can convert messages from one format to another. For example, they can translate messages from electronic form to a physical, and thus reduce the cost and delivery window of the communication piece.

To communicate with the network, the user may initiate an interactive session such as a voice command session, or a web portal session. Given this capability, a user may send different types of otherwise incompatible messages through different networks for different purposes or applications. Examples of messages are described in FIG. 3.

Also, the communication server 170 can provide a feedback loop to let the sender know that the recipient has received the communication. This provides a sender with the certainty of knowing that the message has been delivered.

Figure 2:
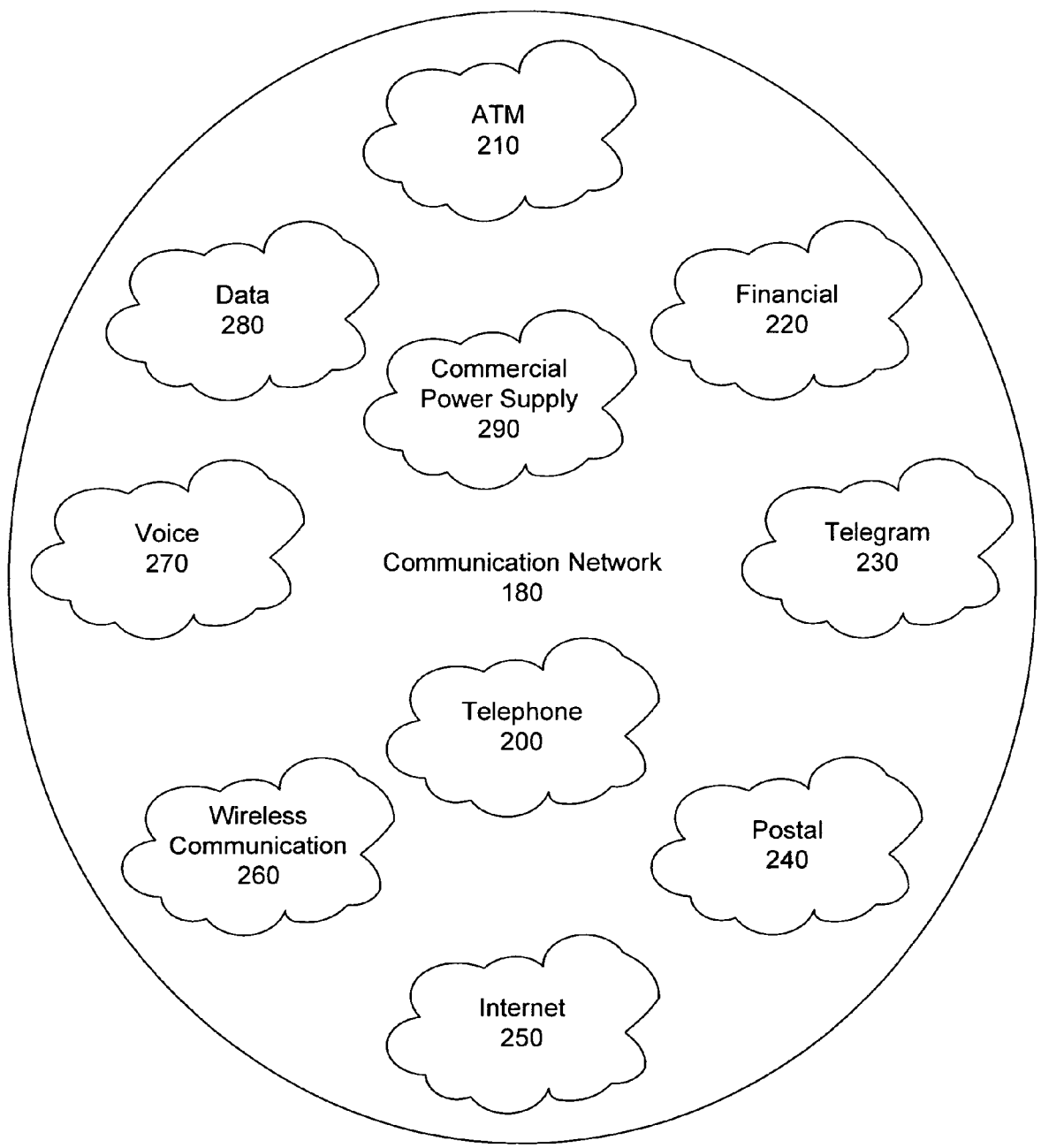
FIG. 2 is a block diagram illustrating an exemplary communication network that may be used in connection with the various embodiments described herein.

FIG. 2 is a block diagram illustrating an exemplary communication network 180 that may be used in connection with the various embodiments described herein. As shown, messages for a user can be delivered through a variety of delivery networks. For example, a message can be delivered by a telephone network 200, ATM network 210, financial network 220, telegram network 230, postal network 240, Internet 250, wireless communication 260, voice network 270, data network 280 (e.g. a computer network), commercial power supply network 290, etc.

The communication network 180 containing the variety of networks provides a user with a number of benefits. For example, the user does not need to purchase the communication infrastructure, such as, voice lines, phones, faxes, computers, etc. to use it. Instead, the user receives a personal multi-network directory and the various associated addresses on the communication network 180. For example, a user without a home telephone number or cellular telephone number will receive a phone number associated with the user account 172 (described in FIG. 5). This way, the user can receive a specific telephone number without the burden of having to maintain costly telephone service through a wired or wireless telephone service provider.

Having a telephone number in the personal multi-network directory accessible from different networks provides the user with many advantages. For example, when the user moves or travels, he/she can still retrieve voice mails from the communication network 170 in any country without having to pay each local service provider for the use of its network since the communication network 170 provides the access to all the network interfaces. Also, it may be very useful if a user is contracting a phone service (without a physical terminal) that will allow the user to send and receive electronic and physical communication pieces from any physical location.

The server provides remote access to a local network as if a user were in the local place. The connections between the server and the various physical and electronic networks can be direct or indirect. For example, the connection to the telegram network can be both direct and indirect through the Internet. The connection to the wireless communication network may also be direct through, e.g., the phone network or the Internet.

Having an access to an integrated communication network 180 provides a user with many additional advantages. For example, it eliminates incompatibility among digital and physical communication networks, and among multi-media communication pieces. Also, it provides reduction of the complexity, delivery window and cost of sending and receiving a specific message through many different networks. Furthermore, it provides the user with a convenient and easy way to use digital inbox to manage all messaging and communication needs in a centralized way. Also, it allows to send the pieces in a cost effective way, e.g. to send one brochure to one destination at a very low cost. Finally, it provides an ability to pay for a very different variety of services from the same prepaid card described in FIG. 6, or using find transfer services over an ATM network 210 or financial network 220.

Figure 3:
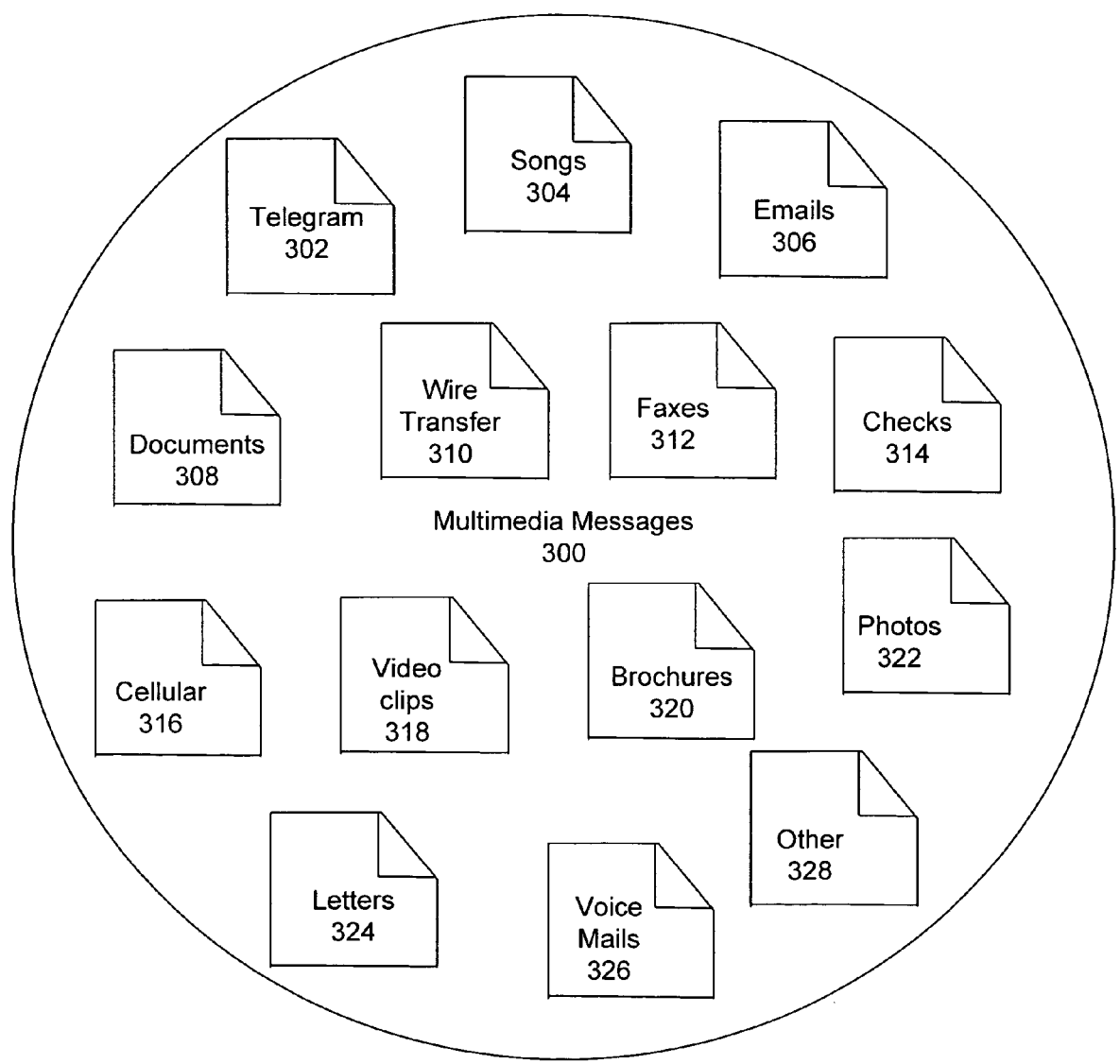
FIG. 3 is a block diagram illustrating exemplary multimedia messages that may be used in connection with the various embodiments described herein.

FIG. 3 is a block diagram illustrating exemplary multimedia messages that may be used in connection with the various embodiments described herein. In the illustrated embodiment, a user may send a variety of communication pieces through different networks for different purposes or applications. For example, the postal service or other physical delivery service can be used for letters and telegrams. Voice message and faxes can be sent via a telecommunication network, emails and SMS.

The user can send a variety of messages. For example, a user may send through the multi-media communication server the following: telegrams 302, songs 304, emails 306, text documents (e.g. contracts, invoices, etc.) 308, wire transfers (e.g. monetary funds) 310, faxes 312, checks 314, SMS cellular messages 316, video clips 318, brochures 320, photographs 322, letters 324, voice mails (phone messages) 326, and other types of messages 328 (faxes, Video Movies, Movie trailers, Pod Casts) or a combination of any of these. In particular, some of the above messages (such as songs, music, audio casts, video casts, audio-video casts) can be components of a digital marketplace, where pieces are sold and delivered via the multi-media communication server and then by the delivery platforms (FIG. 1).

Figure 4:
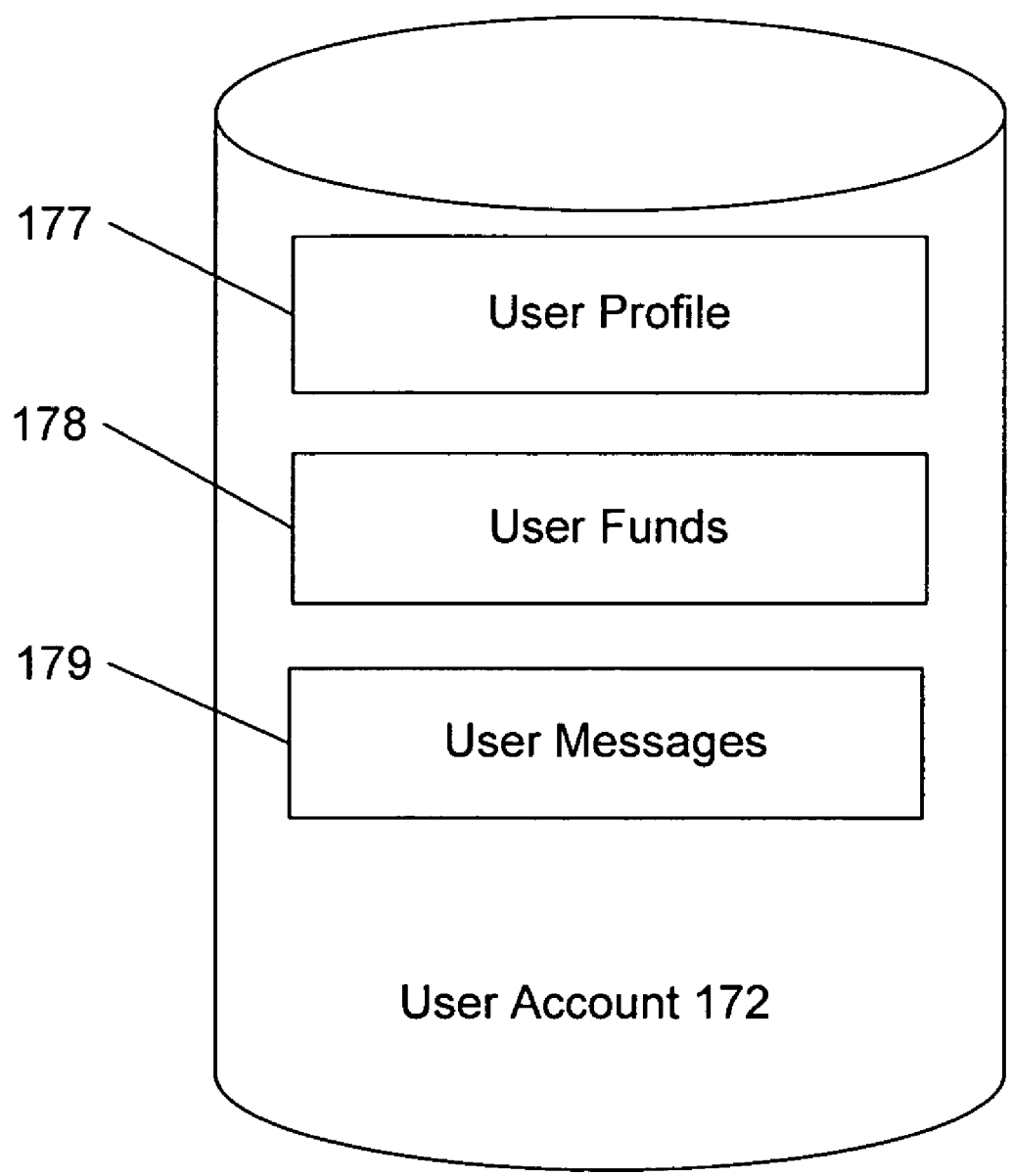
FIG. 4 is a block diagram illustrating an exemplary user account according to an embodiment of the invention.

FIG. 4 is a block diagram illustrating an exemplary user account containing a user profile, user funds and user messages stored on the data storage coupled with the communication server 170. In an illustrated embodiment, a user can have a single identity (an account 172) through the plurality of networks and can receive different communication pieces and messages regardless of the medium used to send the piece. Accordingly, whenever the user enters the network from any access device or location, the user can access all correspondence and communication pieces. After accessing the messages, the user can direct those pieces to be received by the user (or by others) through a variety of networks. The user can retrieve the communication pieces through any convenient delivery network such as postal network, fax, telegram, email, etc., described in FIG. 2.

The user account 172 contains a variety of information about the user and it is linked to an assigned phone address and multi-network directory (and thereby related to all other physical and electronic addresses for the user.) For example, it contains a user profile 177, amount and type of user funds 178 and user messages 179. The account 172 allows the user to select the type of communication pieces to be sent to third parties.

The user account 172 can be loaded with funds by the user via a fund transfer or a credit or debit card transaction. Once the account 172 is loaded with the funds, the different services can be paid out of this account. Thus, the account 172 can act as a "virtual electronic purse." The communication server 170 can convert the account in a virtual prepaid card that can be used for services regardless of the access device, network or application being used. All services can be used and paid for from the same account and all messages will be stored and controlled from the same user account 172. A physical prepaid card can also be printed and delivered via a physical distribution network such as the postal or telegraph network. The physical prepaid card will be described in FIG. 6.

The account 172 also allows the user to store communication pieces (messages) in the user messages storage area 179. The user can designate a specific delivery platform where the communication pieces should be sent. For example, the user may designate that a particular message should be sent by postal network, fax, telegram, email, voicemail, audio-video, etc.

FIG. 5 is a block diagram illustrating an exemplary user profile 177, containing a variety of delivery addresses available to a user. In an illustrated embodiment, the user profile 177 can contain a number of addresses stored at the multimedia multi-network communication server 170. One of the addresses may be a physical address designated by the user for messages in a form of letters. Another address may be designated for telegrams. Yet another address may contain a phone number for SMS messages, another for phone messages, yet another for cellular messages, etc. The user account 172 may also contain a TIVO address, a bank account number, a prepaid card account, a MP3 address, etc. The delivery addresses reflect the type of delivery network employed. For example, the postal service or other physical delivery service can be used for letters and telegrams. Voice messages and faxes can be sent via a telecommunication network. Emails and SMS messages can be sent via a data communication network. Songs, video or television shows can be delivered to a particular IP address of a TIVO or other record and play device.

In another embodiment, a user profile 177 may contain a phone number that is not connected to an actual phone line, but rather is assigned to the user from a pool of phone numbers that are provided by the multi-network communication server 170. In such an embodiment, a user can select the delivery network for communication pieces by selecting from a list of options using an IVR (interactive voice response) module at the multi-network communication server 170 (FIG. 1).

Figure 6:
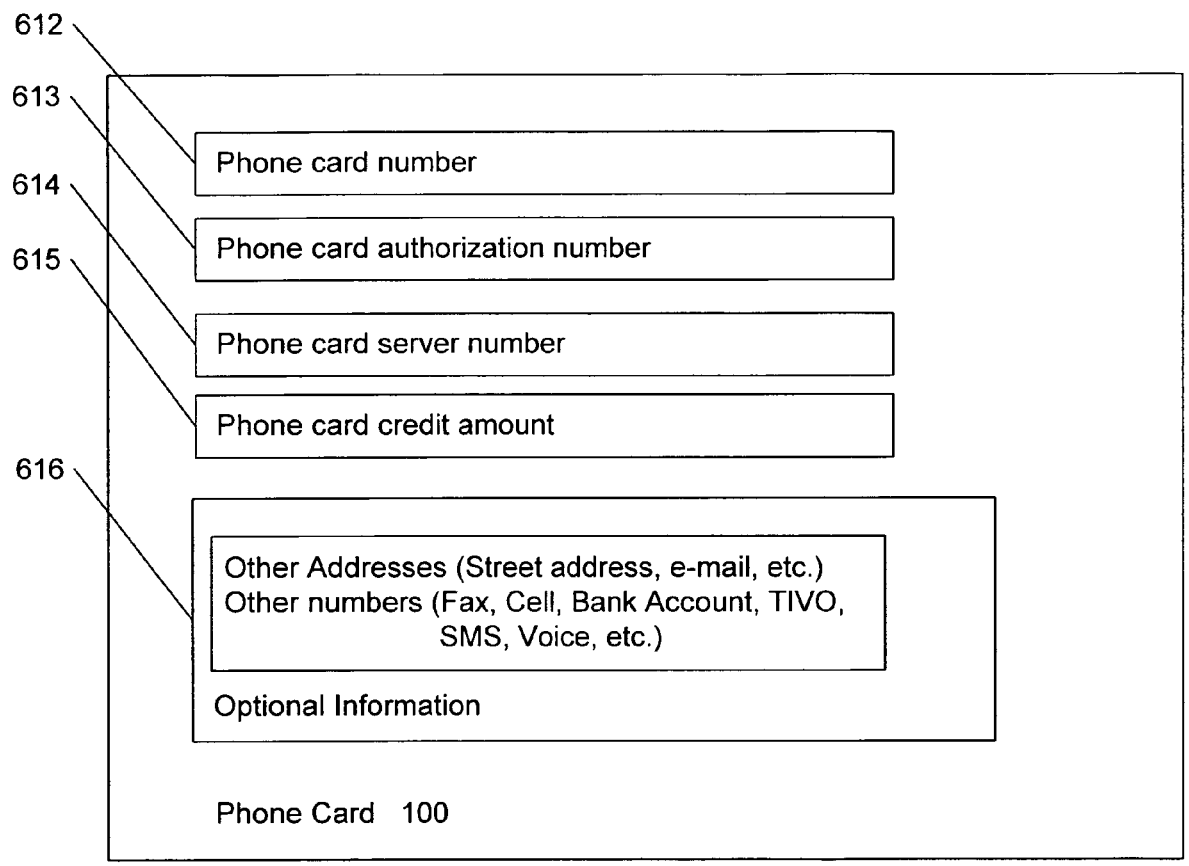
FIG. 6 is a block diagram illustrating an exemplary prepaid phone card containing user profile information according to an embodiment of the invention.

FIG. 6 is a block diagram illustrating an exemplary prepaid phone card containing user profile information. In an illustrated embodiment, the prepaid phone card 100 can be printed and delivered to the user via a physical distribution network such as the postal or telegraph network. The card 100 can contain a variety of types of information that can be used by the communication sever 170 (FIG. 1) to either create or update user account 172 described in FIG. 4.

The prepaid phone card 100 can comprise a prepaid phone card number 612, a prepaid phone card authorization number 613, a prepaid phone card server number 614 and a prepaid phone card credit amount (funds) 615. A user account can be created using the prepaid phone card number 612, and identified using the prepaid phone card server number 614. Then, the user account can be loaded with funds via a new prepaid card, funds transfer or a credit/debit card transaction. Once the account is loaded, the different services can be paid out of this account. The newly created account can be used to pay for services regardless of what access device, network or application is being used.

In another embodiment of the present invention, the prepaid phone card 100 can also contain optional information 616, including a street address for delivery of mail, email address, a fax phone number, a bank account number, a TIVO address, a SMS address, a voice mail phone number, etc. All that information can be used by the communication server 170 to create an account on the server 172, or to update information of the account 172 that already exists on the communication server 170.

Figure 7A:
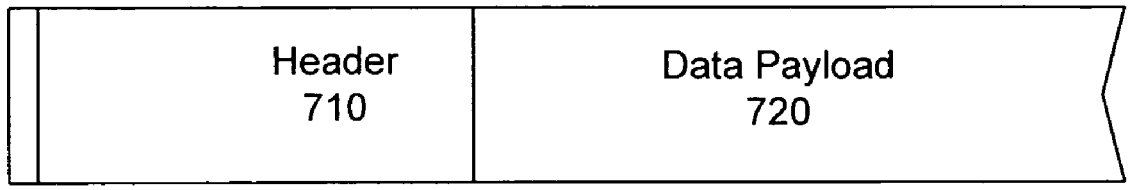
FIG. 7A is a block diagram illustrating an exemplary multimedia message according to an embodiment of the invention.
Figure 7B:
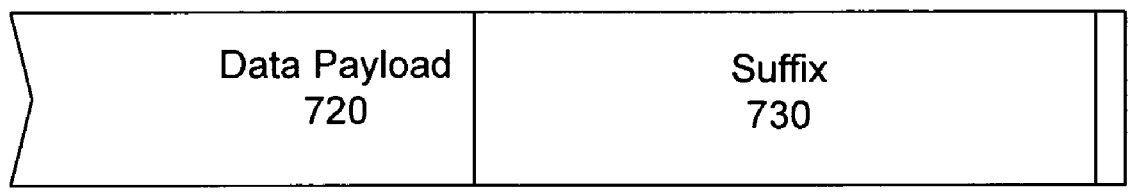
FIG. 7B is a block diagram illustrating an exemplary multimedia message according to an embodiment of the invention.

FIGS. 7A-7B are block diagrams illustrating an exemplary generic multi-media message. In an illustrated embodiment, the destination address of a communication is modified with a prefix (header) 710 or a suffix 730 that indicate the type of communication network that will be used to deliver a data payload 720 by physical or electronic means. For example, to send the payload (message) to one of the multi-network destination the communication server 170 will instruct the networks via a prefix 710 or suffix 730 as to which of networks will be used.

In one embodiment, an additional content can be sent attached to the data payload 720. The additional content will provide special instructions that are necessary for specific networks devices or applications in order to facilitate the communication delivery process. This may be particularly useful for direct mail, sending brochures or contracts, invoices, recorded messages, notifications, proof of deliveries, songs, videos, photographs, clips, monetary funds, etc. For example, the destination address for a cellular "SMS" message may be: SMS: 555-444-333.

The additional information may be useful for delivery of a message to the particular network. For example, an attachment may be advantageously added to the data payload 720 or sent via another network to the same destination for use by the multi-network communication server 170 or a local server (e.g. as a "wav" file for voicemail or a "doc" Word document for a fax).

In another embodiment, the additional content can be sent attached to the communication piece to provide special instructions that are necessary for specific network, devices or applications in order to facilitate the communication delivery process. This may be particularly useful for direct mail, sending brochures or contracts, invoices, recorded messages, notifications, proof of deliveries, songs, videos, photographs, clips, monetary funds, etc.

Figure 8:
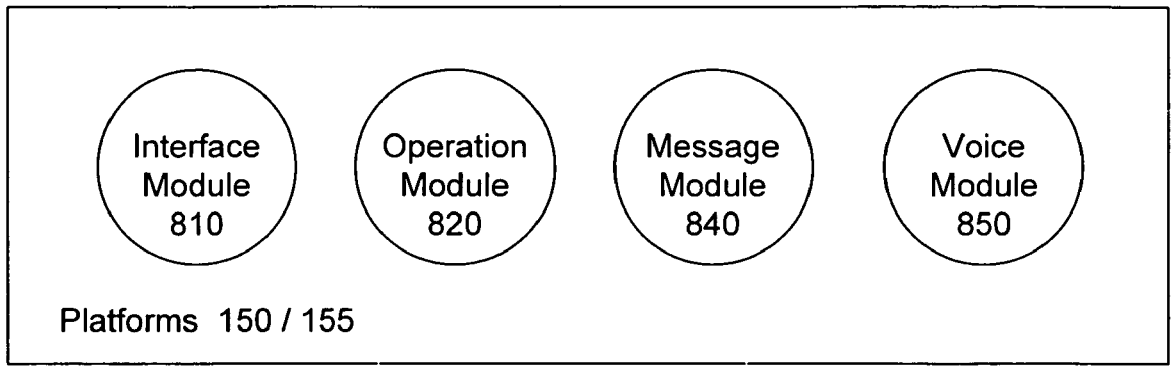
FIG. 8A is a block diagram illustrating an exemplary platform according to an embodiment of the present invention.
FIG. 8B is a block diagram illustrating an exemplary communication server according to an embodiment of the present invention.
Figure 8:
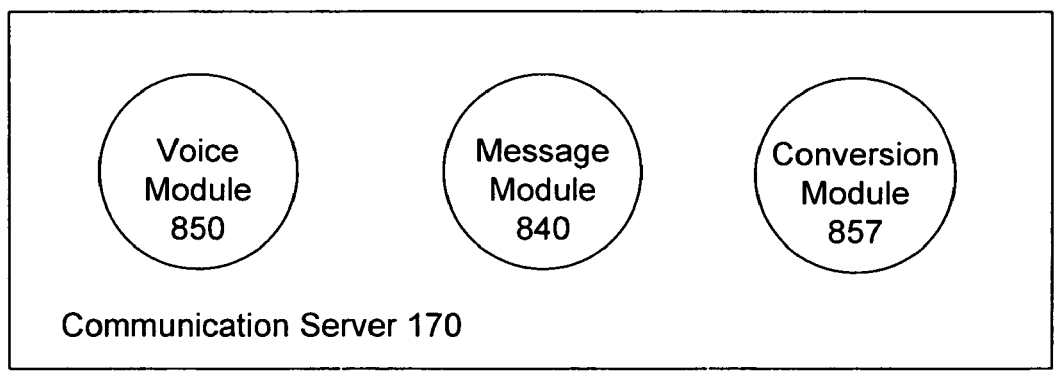

FIG. 8A is a block diagram illustrating an exemplary platform that can be used to facilitate communication between a user and the multi-network communication server. In the illustrated embodiment, if the user wants to send a message to the system, then the user can contact the access platform 150 (FIG. 1.) By accessing the access platform 150, the user can select a type of the communication network for the delivery of a communication piece by physical or electronic means.

If the user wants to receive a message to the system, the user can contact the delivery platform 155 (FIG. 1), which in some applications, could be combined with the access platform 150. For example, a computer (PC) is a system where the access platform 150 is combined with the delivery platform 155 because the computer can send information to and receive information from the network.

In one embodiment, the platform comprises an interface module 810 that can be used to select the communication network for delivery of a specific message. For example, when a user connects to the multi-network communication server 170 (FIG. 1) and wants to send a fax, the interface module 810 may display a message header in a familiar email type format to solicit input of the "TO:" address. Because the user is sending a fax, the "TO:" field can be populated with a prefix that specifies the delivery network (described in FIGS. 7A-7B). For example, the "TO:" field may include: "FAX: 555-444-3333."

In another embodiment, the platform comprises an operation module 820. The operational module 820 can send messages from the access platform 150 to the communication network 180, and send messages from the communication network 180 to the delivery platform 155.

If the delivery network is not an electronic one, a message module 840 can add additional information needed to deliver the message. For example, the message module 840 can add information as an attachment to the message. Additional information may include information about the addressee's name, addressee's address, or instructions for a local sever to print the message on an envelope by the postal network.

In another embodiment, the platform comprises a voice module 850 that allows a user to send and retrieve messages using audio. The voice module 850 contains "text to speech" engines that play audio prompts, receive audio answers and translate audio answers to a digital form. The voice module 850 provides a user with audio instructions so the user without any prior knowledge of the system or computer training can operate, navigate and use the system.

FIG. 8B is a block diagram illustrating an exemplary communication server 170 that can be used to facilitate communication between a variety of communication networks. In the illustrated embodiment, the communication server 170 contains a voice module 850 that allows the communication server 170 to send and retrieve voice messages. Similarly to the voice module 850 on the platforms 150 and 155, the voice module 850 on the communication server 170 provides audio instructions and handles audio answers.

In another embodiment, the communication server 170 contains a message module 840 that can add additional information necessary to deliver a message, such as, for example, a postal message. The message module 840 can add information as an attachment to the message. Additional information may include information about the addressee's name, addressee's address, instructions for a local sever to print the message on an envelope by the postal network, etc.

In another embodiment, the communication server 170 comprises a conversion module 857. Since the third party service providers can use the platforms for a multitude of applications, sending and receiving information may require conversion of messages from a digital format to a physical format, or vice versa. For example, there may be a need to convert a circuit switched phone call into a packet switched phone call to allow answering phone calls by a computer.

The conversion module 857 allows sending and retrieving messages between different networks, such as, for example, between a telephone network and a data network. Exchanging the messages between heterogeneous networks requires that, for example, voice messages are translated to text messages and vice versa. The conversion module 857 contains speech engines, such as, speech recognition systems that convert a voice message into a text message speech, and speech synthesis systems that convert a text message into a voice message.

Figure 9:
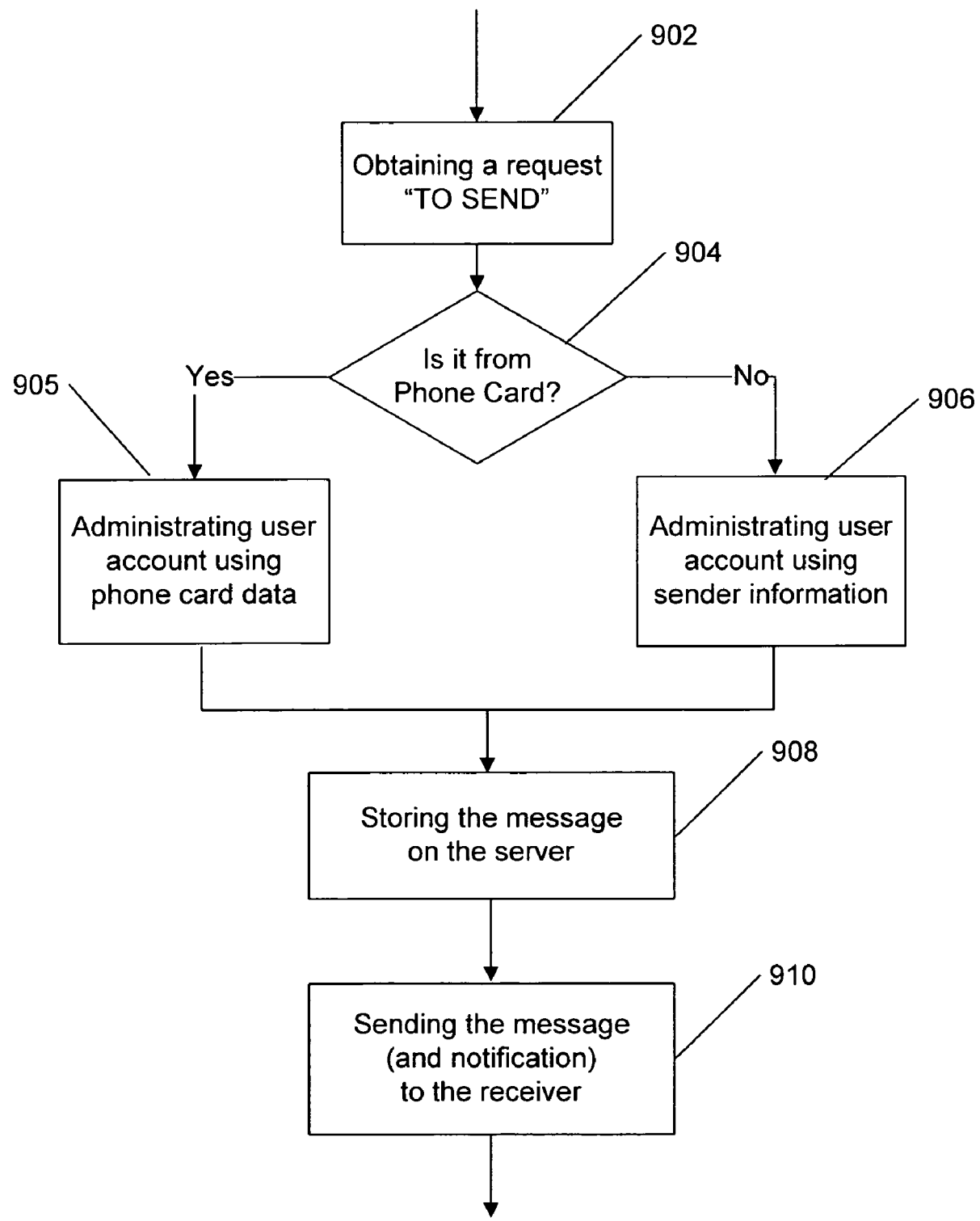
FIG. 9 is a flow chart illustrating an example process for sending messages according to an embodiment of the present invention.

FIG. 9 is a flow chart illustrating an example process for sending messages by a user from an access platform to the multi-network communication server 170 (FIG. 1). In an illustrated embodiment, in a step 902, the user accesses the access platform and inputs a request to send a message over the communication network 180 to the multi-network communication server 170 (FIG. 1). The request reaches the multi-network communication server 170 and the server 170 (FIG. 1) parses it. In a step 904, the server 170 identifies whether the request is from the prepaid phone card 100 (FIG. 1) or from a sender 120 (FIG. 1).

If the request is from the prepaid phone card 100 (FIG. 1), then, in a step 905, the communication server 170 attempts to administer a user account using the prepaid phone card data 905, which will be described in details in FIG. 10. Basically, the administration of the user account using the prepaid phone card data (in the step 905), involves either creating a brand new account on the communication server 170, or updating the information on the already existing account on the server 170.

If the request is from the sender 120 (FIG. 1), then, in a step 906, the communication server 170 attempts to administer a user account using the sender information that is either provided by the platform, or available on the communication server 170. The administration of the account using the sender information will be described in FIG. 11. Basically, the administration amounts to the accessing of the user account on the server 170 using e.g. a user identification provided by the access platform, and reducing the amount of user funds from the account by the value of services requested by the sender.

Once the administration process (steps 905 or 906) is complete, the communication server 170 (FIG. 1) acquires the communication piece (e.g. a message), and, in a step 908, it stores the message on one of its sub-servers, or on the user account 172 attached to the communication server 170. Then, the server 170 identifies the delivery platform or user preferences as to on what media the message should be delivered. To identify the delivery platform or network, the server 170 uses the information about the destination addresses used by the user in the past and stored in the user account 172.

Then, the message might be encrypted for the security reasons, translated to another format (e.g. from a "doc" format to a "pdf" format), or processed to the format required by the delivery platform. Subsequently, the message may be stored in the new format on the server, and/or sent to the delivery platform 155 in a step 910.

Furthermore, in the step 910, the communication server 170 can send the notification about the awaiting message to the recipient. For example, if the sender sends a fax to the communication server 170, the server may send first a notification to the recipient of the fax, and then, send the fax to the fax machine acting as a delivery platform 155. Also, the communication server 170 can send a confirmation to the sender if the messages were successfully delivered.

Figure 10:
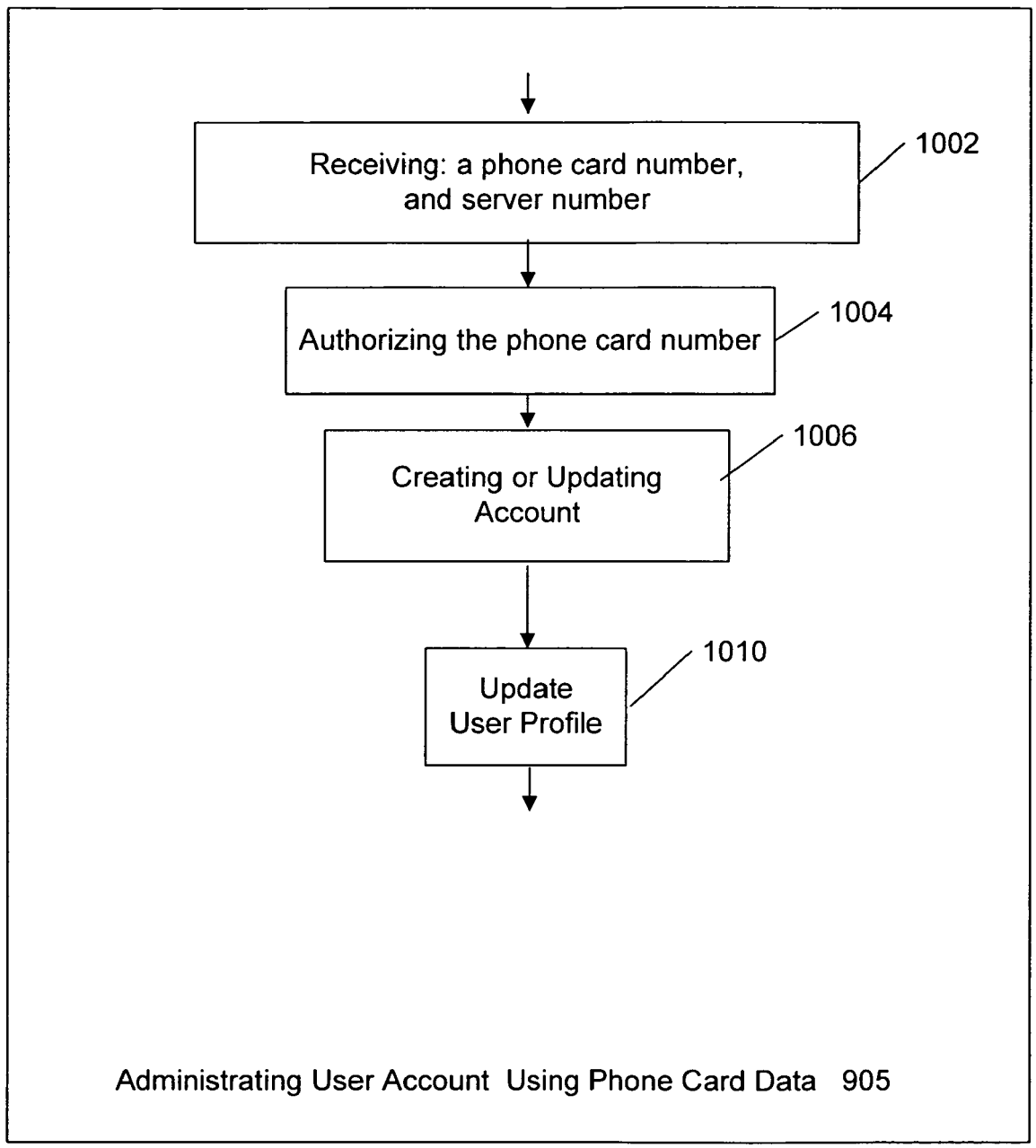
FIG. 10 is a flow chart illustrating an example process for administering user account using prepaid phone card data according to an embodiment of the present invention.

FIG. 10 is a flow chart illustrating an example process for administering user account using prepaid phone card data according to an embodiment of the present invention. As it was described above, even if a user does not yet have a user account on the server, such an account can be created for him on the server using a prepaid phone card data. The prepaid phone card data can be provided by a third party and it can comprise functionalities of a typical credit/debit card.

In an illustrated embodiment, if the request came from a phone card, the communication server 170 can create an account and use the funds indicated on the card to upload the account. In a step 1002, the communication server 170 reads the prepaid phone card number and a local server number (alternatively, a credit card number). That information is used later to identify e.g. appropriate access platform or delivery platform (FIG. 1).

In a step 1004, the communication server 170 attempts to authorize the prepaid phone card number by using e.g. an encryption code, or other security mechanisms. For example, the authorization can amount to the verification whether the particular card is legitimate and whether it was legitimately purchased for value. The authorization information may be included in the prepaid phone card itself.

If the card is authorized and approved, then, in a step 1006, the communication server 170 can create a new account on the server 170. The creating of the new account amounts to allocating some space for the account on the server 170, linking the account with the identification from the phone/credit card, storing information about a user profile, user funds, and allocating some space for the user messages.

The prepaid phone card may contain information necessary for the creating of the user profile. The example of the user profile is provided in FIG. 5. In addition to the prepaid phone card number, prepaid phone card server number, prepaid phone card credit amount, the card can contain some optional information, such as, for example, a street address, email address, fax phone number, cellular phone number, bank account number, etc. In a step 1010, all that information can be stored under the user profile on the user account on the communication server 170.

Alternatively, if the corresponding account already exists, instead of the creating of the user account, the communication server 170 can update some of the information previously stored on the user account. For example, the prepaid phone card may request adding funds to the user account, changing some of the addresses, phone numbers, or preferences as to the type/location of the access or delivery platform.

Figure 11:
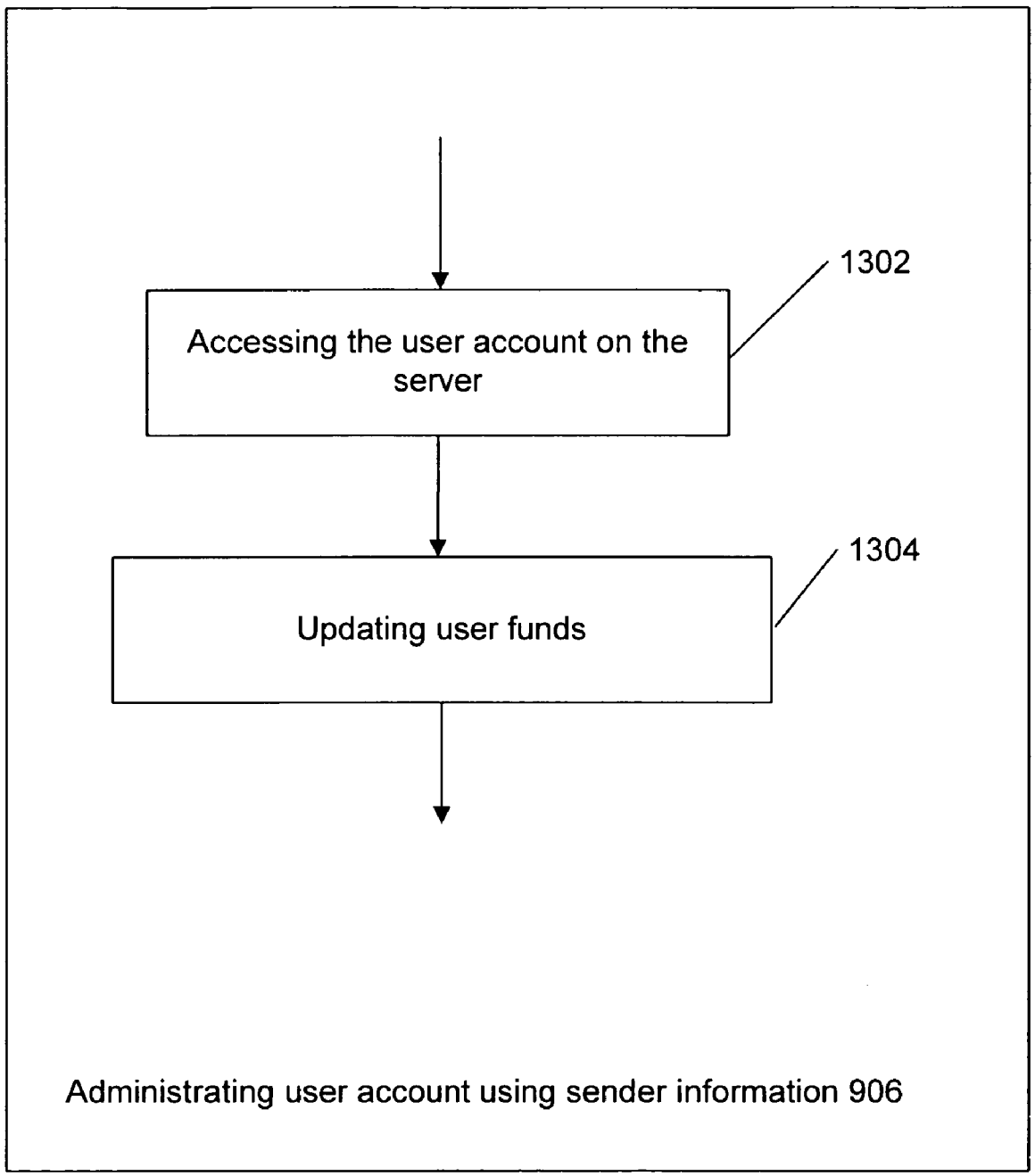
FIG. 11 is a flow chart illustrating an example process for administering user account using sender information according to an embodiment of the present invention.

FIG. 11 is a flow chart illustrating an example process for administering user account using sender information according to an embodiment of the present invention. As it was described above, once a user is provided with an account on the communication server 170 (FIG. 1), the user can select the type of communication pieces that will be sent to him/her, or to third parties. The user account 172 (FIG. 4) comprises user profile, funds and messages. The administering of the user account amounts to, in a step 1302, the accessing of the user account on the server 170 using the account identification (e.g. a code, id, number, etc.). Some of the accounts may require authorization, or entering a security code.

In a next step 1304, the communication server 170 updates the user funds by subtracting the value of requested services from the amount of funds available to the user and stored on the user account 172 (FIG. 1). In the case where the user account does not contain sufficient funds to provide the services requested by the user, the communication server 170 can e.g. send the "insufficient funds" notification to the sender or the access platform.

Figure 12:
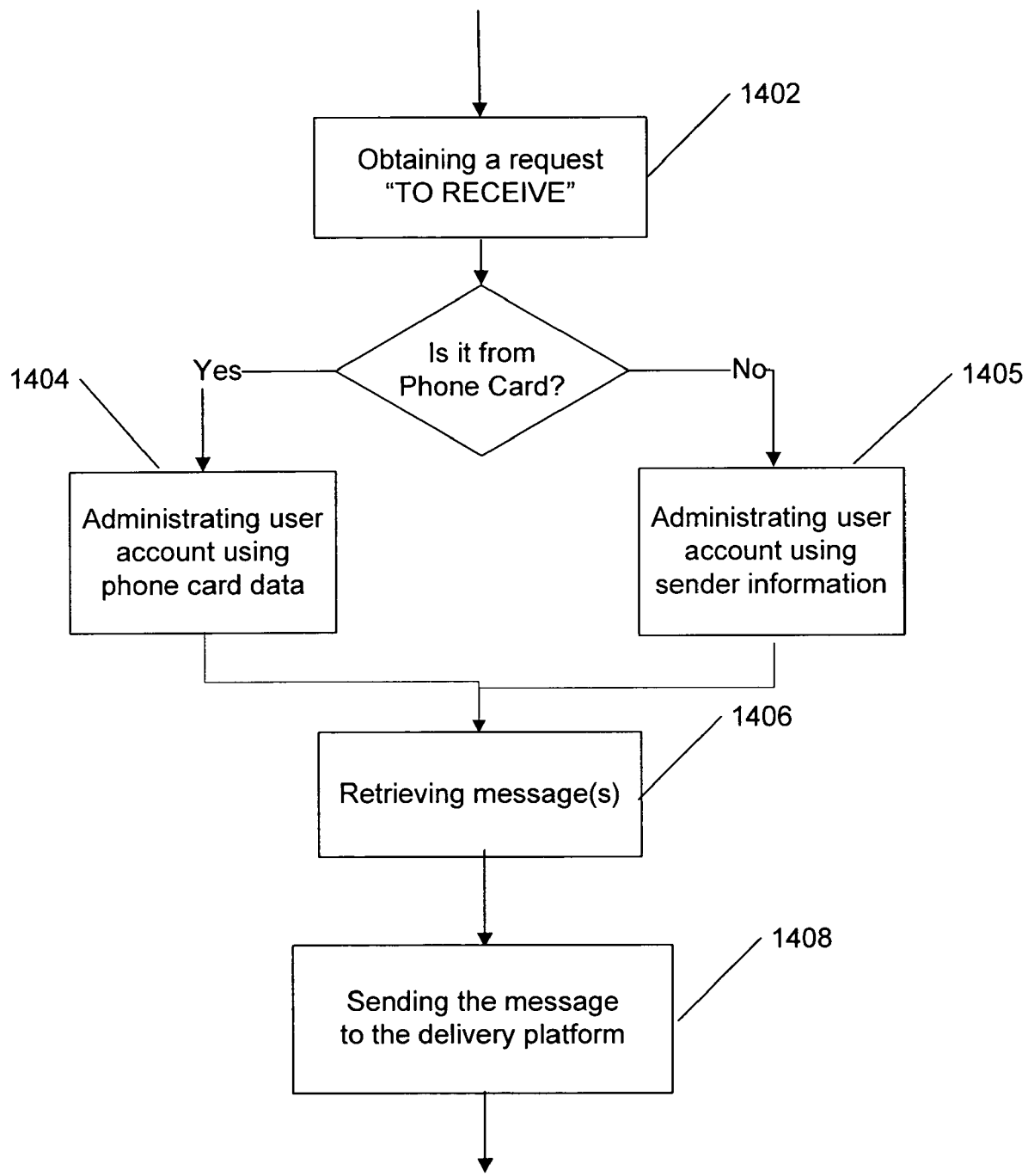
FIG. 12 is a flow chart illustrating an example process for receiving messages according to an embodiment of the present invention.

FIG. 12 is a flow chart illustrating an example process for receiving messages by a user from the multi-network communication server 170 (FIG.1) on the delivery platform 155 (FIG. 1). In an illustrated embodiment, in a step 1402, the user accesses the access platform and inputs a request to receive a message (messages) from the multi-network communication server 170 (FIG. 1) over the communication network 180.

In a step 1404, the request reaches the multi-network communication server 170 and the server 170 (FIG. 1) parses the request. If the request is from the prepaid phone card 100 (FIG. 1), then, in a step 1404, the communication server 170 attempts to administer a user account using the prepaid phone card data. In the step 1404, the communication server 170 can update some (or all) information on the already existing account on the server 170 including the uploading (or debiting) of the user funds.

If the request is from the recipient 120 (FIG. 1), then, in a step 1405, the communication server 170 attempts to administer a user account using the recipient information that is either provided by the platform, or available on the server 170. The administration of the account using the recipient information amounts to the accessing of the user account on the server by the communication server 170, using e.g. a user identification provided by the access platform, and decreasing the amount of user funds on the account by the value of services requested by the sender.

Once the administration process (1404 and 1405) is complete, in a step 1406, the communication server 170 (FIG. 1) acquires the communication piece (e.g. a message) from the server, and, in a step 1408, the communication server 170 sends the message to the delivery platform 155 (FIG. 1). To identify the delivery platform or network, the server 170 uses the destination addresses invoked by the user in the past and/or stored in the user account 172.

In one embodiment of the present invention, the message can be encrypted for the security reasons, translated to another format (e.g. from a "doc" format to a "pdf" format), or processed to the format required by the delivery platform.

Figure 13:
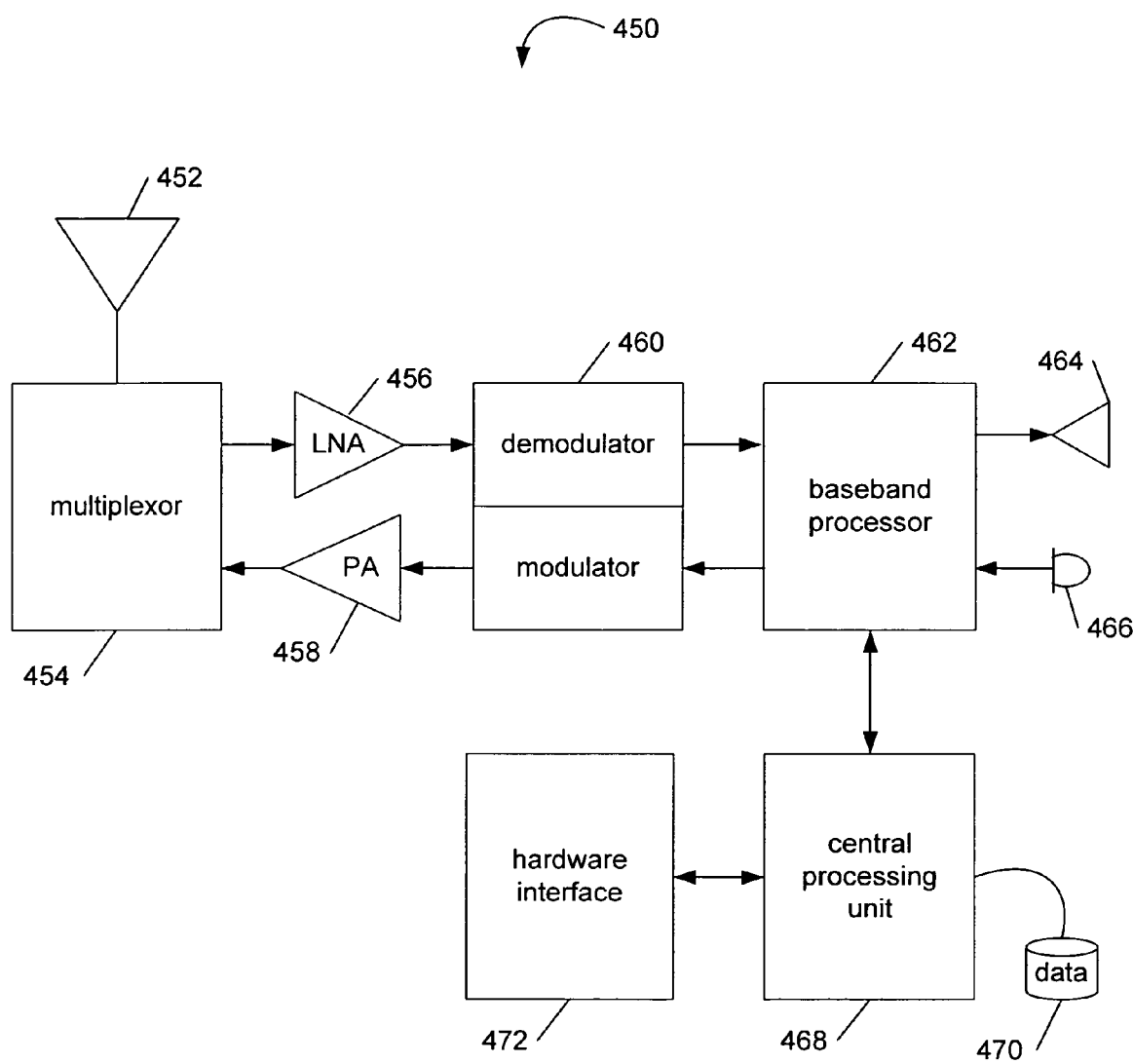
FIG. 13 is a block diagram illustrating an exemplary communication device that may be used in connection with the various embodiments described herein.

FIG. 13 is a block diagram illustrating an exemplary communication device 450 that may be used in connection with the various embodiments described herein. For example, the communication device 450 may be used in conjunction with an access platform. Other communication devices and/or architectures may also be used, as will be clear to those skilled in the art.

In the illustrated embodiment, the communication device 450 comprises an antenna 452, a multiplexor 454, a low noise amplifier ("LNA") 456, a power amplifier ("PA") 458, a modulation circuit 460, a baseband processor 462, a speaker 464, a microphone 466, a central processing unit ("CPU") 468, a data storage area 470, and a hardware interface 472. In the communication device 450, radio frequency ("RF") signals are transmitted and received by antenna 452. Multiplexor 454 acts as a switch, coupling antenna 452 between the transmit and receive signal paths. In the receive path, received RF signals are coupled from a multiplexor 454 to LNA 456. LNA 456 amplifies the received RF signal and couples the amplified signal to a demodulation portion of the modulation circuit 460.

Typically modulation circuit 460 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 462.

If the base-band receive audio signal contains audio information, then base-band processor 462 decodes the signal and converts it to an analog signal. Then the signal is amplified and sent to the speaker 464. The base-band processor 462 also receives analog audio signals from the microphone 466. These analog audio signals are converted to digital signals and encoded by the base-band processor 462. The base-band processor 462 also codes the digital signals for transmission and generates a base-band transmit audio signal that is routed to the modulator portion of modulation circuit 460. The modulator mixes the base-band transmit audio signal with an RF carrier signal generating an RF transmit signal that is routed to the power amplifier 458. The power amplifier 458 amplifies the RF transmit signal and routes it to the multiplexor 454 where the signal is switched to the antenna port for transmission by antenna 452.

The baseband processor 462 is also communicatively coupled with the central processing unit 468. The central processing unit 468 has access to a data storage area 470. The central processing unit 468 is preferably configured to execute instructions (i.e., computer programs or software) that can be stored in the data storage area 470. Computer programs can also be received from the baseband processor 462 and stored in the data storage area 470 or executed upon receipt. Such computer programs, when executed, enable the wireless communication device 450 to perform the various functions of the present invention as previously described.

In this description, the term "computer readable medium" is used to refer to any media used to provide executable instructions (e.g., software and computer programs) to the communication device 450 for execution by the central processing unit 468. Examples of these media include the data storage area 470, microphone 466 (via the baseband processor 462), antenna 452 (also via the baseband processor 462), and hardware interface 472. These computer readable mediums are means for providing executable code, programming instructions, and software to the communication device 450. The executable code, programming instructions, and software, when executed by the central processing unit 468, preferably cause the central processing unit 468 to perform the inventive features and functions previously described herein.

The central processing unit is also preferably configured to receive notifications from the hardware interface 472 when new devices are detected by the hardware interface. Hardware interface 472 can be a combination electromechanical detector with controlling software that communicates with the CPU 468 and interacts with new devices.

Figure 14:
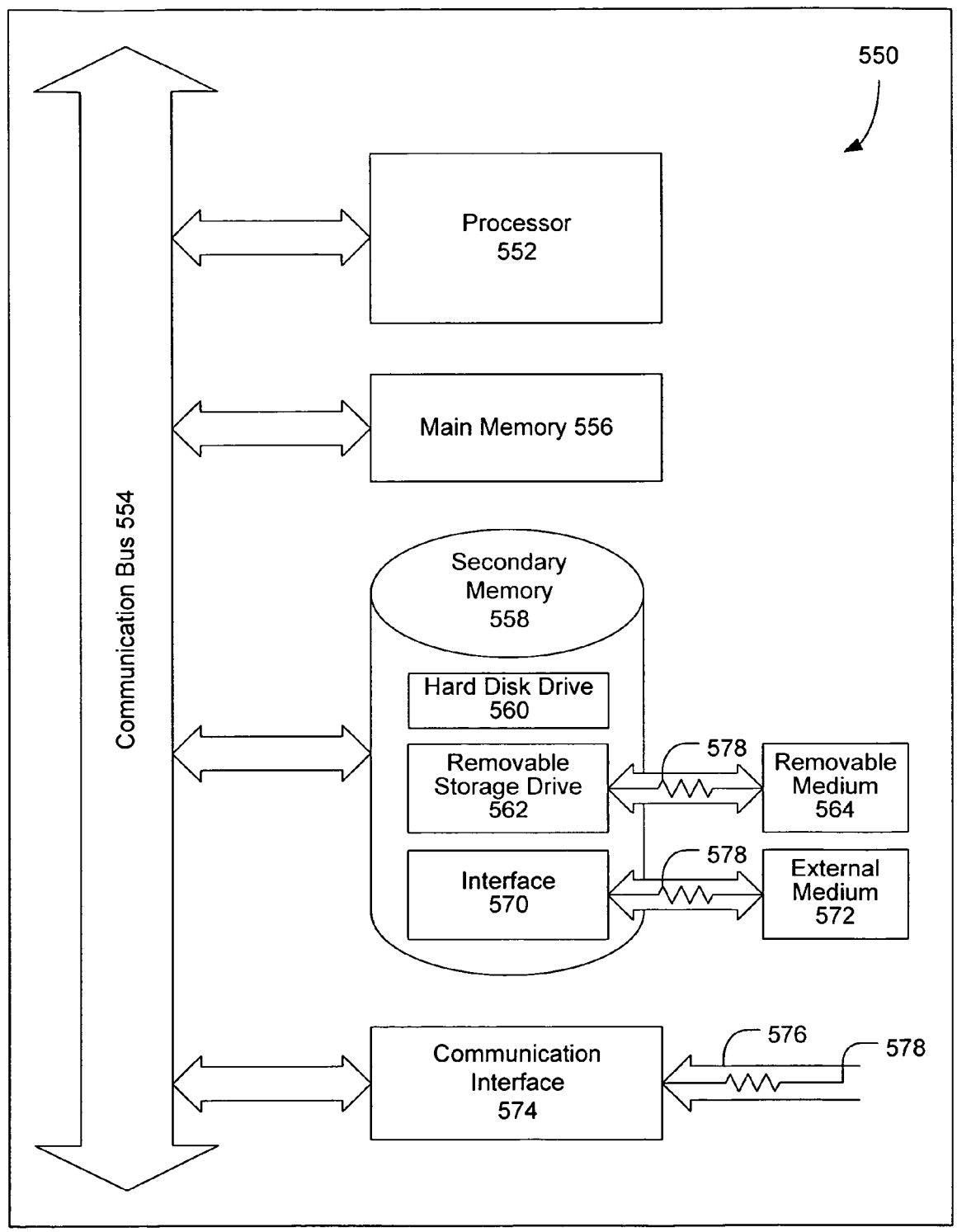
FIG. 14 is a block diagram illustrating an exemplary computer system as may be used in connection with various embodiments described herein.

FIG. 14 is a block diagram illustrating an exemplary computer system 550 that may be used in connection with the various embodiments described herein. For example, the computer system 550 may be used in conjunction with an access platform or the multi-network communication server. Other computer systems and/or architectures may also be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital user line ("DSL"), asynchronous digital user line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A computer implemented multi-media communication system for receiving and delivering of multi-media calls and messages over multiple networks comprising:
   a multi-network communication server comprising a voice module allowing voice-driven navigation through the system, the multi-network communication server configured to administer user accounts and process user requests coupled with a plurality of disparate communication networks and a data storage area;
   an access platform comprising a voice module, coupled to the multi-network communication server via one or more of the communication networks, coupled with a data storage area, configured to access the multi-network communication server, and to send a multi-media message to the multi-network communication server;
   a delivery platform comprising a voice module, coupled to the multi-network communication server via one or more of the communication networks, coupled with a data storage area, configured to receive a multi-media message from the multi-network communication server; and
   a phone calling card containing information about a user profile and funds allowing a user to receive the services and communicate with the multi-network communication server through a provided address, wherein, the multi-network communication server communicates with the access platform and the delivery platform via a communication network.

2. The system of claim 1, wherein the provided address is a Direct Inward Dial ("DID") number.

3. The system of claim 1, wherein the provided address is an e-mail address.

4. The system of claim 1, wherein the voice module comprises a speech recognition system.

5. The system of claim 1, wherein the voice module comprises a voice synthesizing system.

6. The system of claim 1, wherein a user account is administered by the multi-network communication server based on information included in a phone calling card and provided by the user.

7. The system of claim 1, wherein the access platform passes requests from sending users, prepaid phone card users and agent users to the multi-network communication server.

8. The system of claim 1, wherein the delivery platform passes the multi-media calls and messages from the multi-network communication server to receiving users and agent users.

9. The system of claim 1, wherein the plurality of communication networks comprises an audio communication network configured to interface with other communication networks.

10. The system of claim 1, wherein the plurality of communication networks comprises a data communication network configured to interface with other communication networks.

11. The system of claim 1, wherein the plurality of communication networks comprises a telegram network configured to interface with other communication networks.

12. The system of claim 1, wherein the plurality of communication networks comprises a postal network.

13. The system of claim 1, wherein the plurality of communication networks comprises a financial transaction network.

14. The system of claim 1, wherein the plurality of multi-media messages comprises voice messages.

15. The system of claim 1, wherein the plurality of multi-media messages comprises data messages.

16. The system of claim 1, wherein the plurality of multi-media messages comprises audio messages.

17. The system of claim 1, wherein the plurality of multi-media messages comprises postal messages.

18. A computer implemented method for communicating multi-media messages using a phone calling card and a phone number via a plurality of communication networks, comprising:
   creating a user account on a multi-network communication server based on information stored on a phone calling card and provided by a user;
   authorizing a phone calling card user to communicate with the multi-network communication server;
   sending a multi-media message from an access platform to the multi-network communication server;
   receiving the multi-media message from the multi-network communication server at a delivery platform;
   providing the user with a phone number and password for future access; and
   allowing the user to navigate the system by voice commands, receive original text messages via voice delivery and respond to text messages by voice.

19. The method of claim 18, wherein the sending of the multi-media message from an access platform to the multi-network communication server via the communication network further comprises:
- accessing the access platform configured to communicate with the user and the communication network from the multi-media communication server;
- verifying the user account on the multi-media communication server, wherein the multi-media communication server is coupled with a data storage area containing user accounts;
- sending the multi-media message from the access platform to the multi-media communication server via the communication network;
- saving the multi-media message on the data storage coupled to the multi-media communication server; and
- passing the confirmation from the multi-media communication server to the access platform via the communication network.

20. The method of claim 18, wherein the receiving of the multi-media message by the receiving user from the multi-network communication server further comprises:
- accessing an access platform configured to communicate with the user and the communication network from the multi-media communication server;
- verifying the user account on the multi-media communication server, wherein the multi-media communication server is coupled with a data storage area containing user accounts;
- sending the multi-media message from the multi-media communication server to the delivery platform via the communication network; and
- passing the confirmation from the multi-media communication server to the delivery platform via the communication network.

* * * * *